| United States Patent Office | 3,287,242 |
|---|---|
| | Patented Nov. 22, 1966 |

3,287,242
SYNTHESIS OF HIGH POLYMERS IN ELECTRICAL DISCHARGES
Marvin C. Tobin, Westport, Conn., and William G. Deichert, Flushing, N.Y., assignors to American Cyanamid Company, New York, N.Y., a corporation of Maine
No Drawing. Filed May 19, 1961, Ser. No. 111,144
1 Claim. (Cl. 204—165)

The present invention relates to a novel homopolymer of propylene oxide and to its preparation. More particularly, it relates to a thermally stable polypropylene oxide homopolymer prepared from the corresponding monomer. Still more particularly, it is concerned with the polymerization of ordinarily liquid propylene oxide induced by electric discharge techniques.

In the past, propylene oxide and other olefin oxides have been polymerized by catalytic chemical means. Resultant polymers are primarily crystalline and substantially thermally unstable. As such, their utility has been substantially limited due to the inherent nature of the so-prepared polymers. Thus, when the latter are formed into films, the polymers melt at temperatures below about 75° C. This is not wholly satisfactory, since it is more desirable for many purposes to prepare high melting or thermally stable, substantially non-crystalline polymers.

It is, therefore, a principal object of the present invention to prepare a novel, thermally stable polymer from ordinarily polymerizable propylene oxide. It is a further object to prepare such a polymer from polymerizable propylene oxide by simplified non-chemical procedures. Other objects and advantages will become apparent to those skilled in the art from a consideration of the following detailed description.

To this end, liquid propylene oxide can be polymerized in a straightforward manner by means of electric discharge techniques. Propylene oxide forms solid amorphous films having no well defined melting point, but are stable over a wide temperature range, usually to about 350° C.

According to the process of the invention, amorphous polymers from propylene oxide are unexpectedly formed by subjecting the latter oxide to the action of an electric field created by electric discharge involving relatively low orders of energy input. Advantageously, the polymerization process is carried out at room temperature or below. Hence, large capital expenditures for equipment necessary either for heating a reaction mass or for imparting the required energy to induce molecular change become wholly unnecessary.

As hereinabove mentioned, the reaction medium comprising propylene oxide monomer is subjected to an electric field. This field is created by providing for voltages between about 1000 and 40,000 at frequencies of about 20 to about 100 cycles per second. Voltages in the range of between about 10,000 and about 20,000 and frequencies from about 50 and 75 cycles per second are preferred for optimum results. While propylene oxide may be treated directly, it has been found that by subjecting the monomer to the direct action of such voltages, a violent, uncontrollable reaction is created. It is, therefore, a preferred practice to subject the propylene oxide to an electric discharge while physically imposing a barrier between it and the electrodes employed in creating such electric discharge. This is accomplished by utilizing any conventional non-conductor separator, such as glass. In this manner, the reaction is less violent and more controllable. It has been further found that the temperature of the reaction mass may be reduced from room temperature to a range from about +10° C. to about −10° C. to insure adequate control of the reaction.

Any suitable apparatus for providing the required voltage may be employed. Exemplary of the latter may be mentioned a high voltage, step-up A.C. transformer. In general, the voltages can be varied by means of a conventional variac connected to the primary of the transformer. This is desirable, since the reaction can otherwise be unduly violent, particularly when subjecting the monomer to high initial voltages, say, in the range of 20,000 volts in direct contact with the electrodes. These voltages are, therefore, gradually applied commencing at about 7,500 volts. Voltages are increased to about 20,000 volts in predetermined increments over a period of some thirty minutes or less. At the increased voltage, polymerization is completed within about thirty hours or less.

The design of the polymerization reactor may be widely varied. As stated previously, it is a good practice to maintain a separation between the electrodes used in creating the electric discharge. Thus, in one such reactor design, a U tube comprising three concentric glass tubes is provided. The outer tube contains an electrode which is immersed in any commercially available electrolyte such as an aqueous solution containing five to ten percent sodium chloride. The tube adjacent to the outer tube contains the propylene oxide monomer to be treated. The innermost tube houses a second electrode which is also immersed in an electrolyte. To commence polymerization, each of the electrodes is connected to a high voltage transformer which, in turn, is connected to a variac attached to a power source. It is understood, however, that any equivalent apparatus which is suitable for providing the requisite voltages is within the purview and contemplation of this disclosure.

The practice of the present invention is further illustrated by the following examples which are to be taken as illustrative only.

*Example 1*

A Pyrex U tube reactor, approximately eighty centimeters in overall length and two centimeters in thickness, comprising three concentric sections, is half-filled with a dilute salt solution in the outer and inner sections and propylene oxide in the central section. Into each electrolyte is placed a copper electrode shielded from the other. The electrodes are then directly connected to a 20,000 volt, 60 cycle transformer whose voltage is regulated by a variac transformer which is connected to 110 volt A.C. power source.

The reactor and contents are next placed in an ice-water bath maintained at about 0° C. and a voltage of about 7,500 volts is applied by means of the variac. This voltage is maintained for about fifteen minutes during which time interval polypropylene oxide is seen to form as a film on the glass surface. In the next five minutes, the voltage is permitted to be increased to 8,500 volts and finally increased to 20,000 volts in the next five minutes. The latter voltage is maintained over a thirty hour period. Approximately sixty percent of the liquid is now converted to a solid film. The latter is scraped from the surface of the reactor to recover particles of polymer. These are insoluble in water, ether, acetone, benzene, chloroform and ethyl alcohol indicating a highly cross-linked state. The particles are next examined microscopically. At room temperature the particles appear to be clear. When the particles are heated to about 300° C., no apparent change occurs. However, by increasing the temperature from 300° C. to about 350° C., the particles remain thermally stable. However, a slight yellowing in color is observed. Upon further heating above 350° C., the particles appear to depolymerize and disappear.

The homopolymer of the present invention can be employed to coat ordinary writing paper by a direct application thereto. A sheet of paper, 2 x 2 centimeters, is inserted into the reaction medium prior to reaction and removed after polymerization terminates.

The so-treated paper is rendered water- and heat-proofed.

*Example 2*

Example 1 is repeated in every material detail, except that the temperature of the reaction medium is not cooled to about 0° C., but is maintained at about room temperature. When the voltage is initially applied, agitation or movement of the reactant is observed and, as polymerization progresses, the reaction becomes quiescent. Approximately forty-five percent of the liquid oxide monomer is converted to the solid polymer.

We claim:

An amorphous, solid, thermally-stable to temperatures up to about 350° C., cross-linked propylene oxide homopolymer, said homopolymer being prepared by: subjecting propylene oxide to a field induced by an electric discharge created by providing a voltage across said field of between about 1000 volts and about 40,000 volts at from about 20 to about 100 cycles per second whereby the liquid propylene oxide solidifies, and thereafter recovering said propylene oxide homopolymer.

References Cited by the Examiner

UNITED STATES PATENTS

| | | | |
|---|---|---|---|
| 2,706,181 | 4/1955 | Pruitt et al. | 260—2 |
| 2,778,793 | 1/1957 | Thomas et al. | 204—165 |
| 2,864,755 | 12/1958 | Rothacker | 204—165 |
| 2,906,738 | 9/1959 | Goldberg | 260—77.5 |
| 2,938,875 | 3/1960 | Martin et al. | 260—2 |
| 2,962,453 | 11/1960 | Phillips et al. | 260—2 |
| 2,982,742 | 5/1961 | Smith et al. | 260—2 |

FOREIGN PATENTS 914,435   7/1954   Germany.

OTHER REFERENCES

Miller et al.: J. of Polymer Science, 14, 503–504 (1954).

JOHN H. MACK, *Primary Examiner.*

JOHN R. SPECK, JOSEPH E. LIBERMAN, *Examiners.*

H. S. WILLIAMS, L. P. SULLIVAN,
  *Assistant Examiners.*